United States Patent [19]
Marsh et al.

[11] 3,872,755
[45] Mar. 25, 1975

[54] SAW TABLE

[75] Inventors: Walter G. Marsh, Birmingham; Melvin K. Mercier, Detroit; James J. Rhoades, Westland, all of Mich.

[73] Assignee: Tapco Products Company, Inc., Detroit, Mich.

[22] Filed: July 16, 1973

[21] Appl. No.: 379,329

[52] U.S. Cl. .............................. 83/471.3, 83/486.1
[51] Int. Cl. ........................ B27b 5/20, B27b 9/04
[58] Field of Search ....... 83/471.3, 471.2, 574, 745, 83/486.1, 466, 454

[56] References Cited
UNITED STATES PATENTS

| | | | |
|---|---|---|---|
| 2,633,162 | 3/1953 | Neuenschwander | 83/471.3 X |
| 2,708,465 | 5/1955 | Huebner et al. | 83/471.2 X |
| 2,818,892 | 1/1958 | Price | 83/471.3 X |
| 3,195,591 | 7/1965 | Haberman | 83/471.2 |
| 3,379,228 | 4/1968 | Carlberg et al. | 83/471.2 |
| 3,730,042 | 5/1973 | Price | 83/471.3 |

*Primary Examiner*—Donald R. Schran
*Attorney, Agent, or Firm*—Barnes, Kisselle, Raisch & Choate

[57] ABSTRACT

A saw table including a table for supporting a workpiece, a track and means for rotatably mounting said track with respect to said table such that a portable saw movable along the track is supported in spaced relations to the table for cutting a workpiece on the table.

6 Claims, 8 Drawing Figures

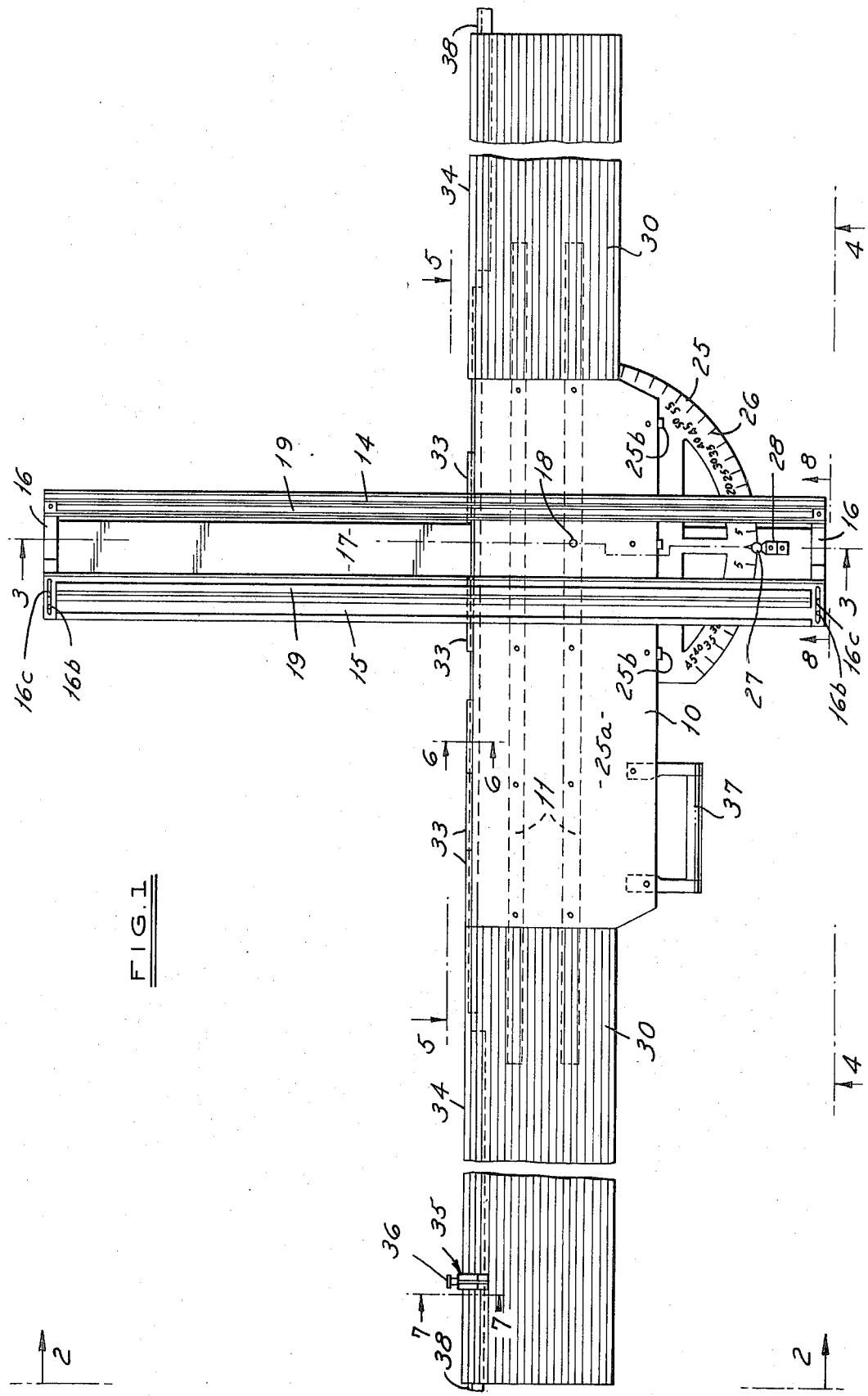

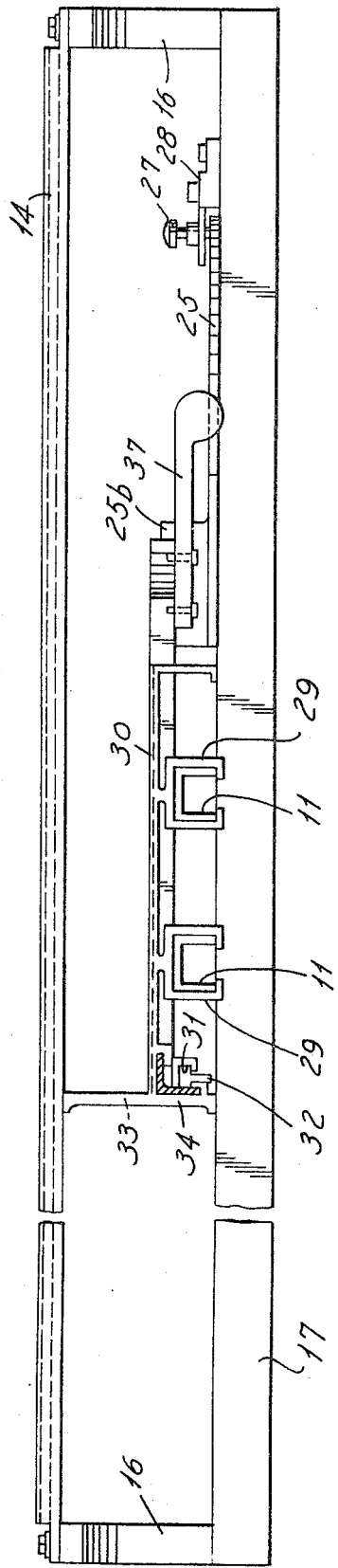
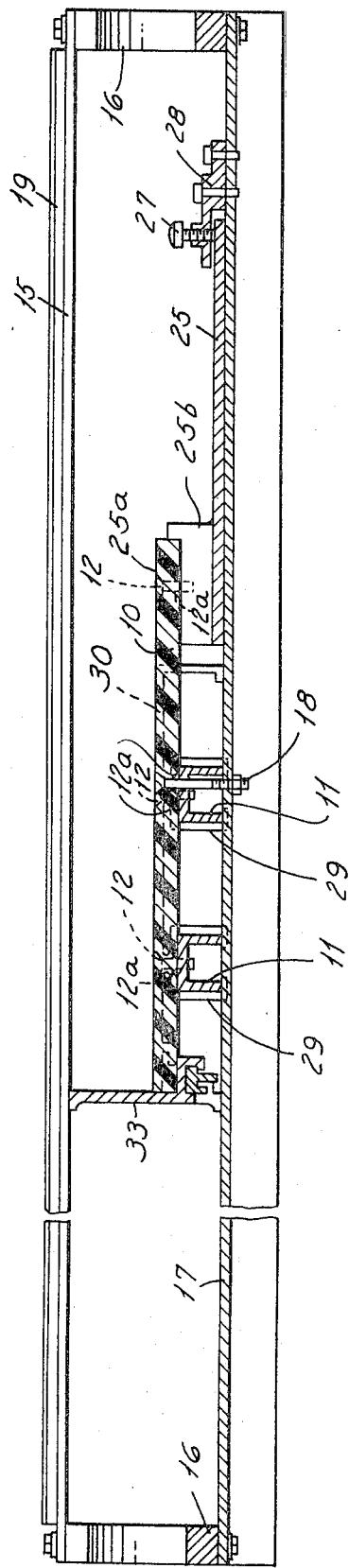

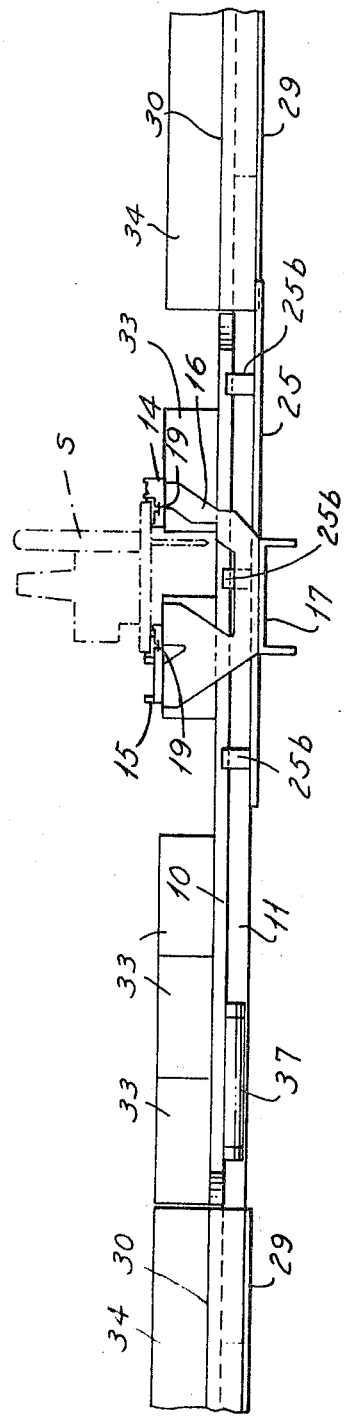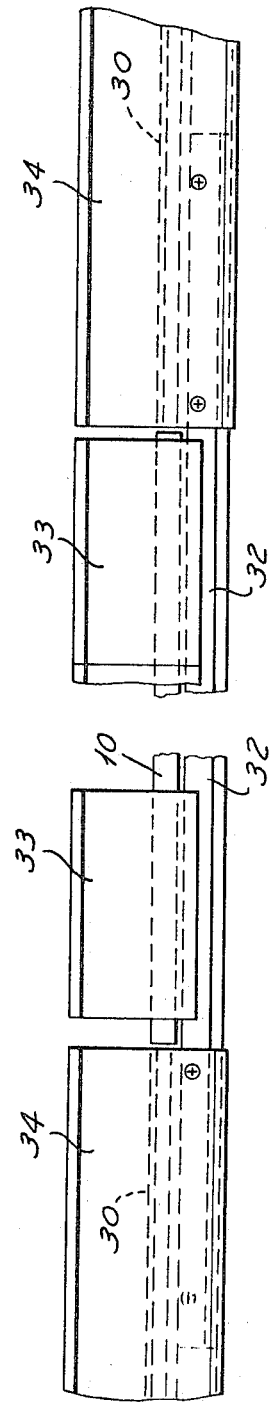

SAW TABLE

This invention relates to saw tables and particularly to a table for supporting a portable saw in predetermined relationship to a workpiece on the table.

BACKGROUND OF THE INVENTION

It has heretofore been suggested that a track be angularly disposed with respect to a workpiece for supporting a portable saw in predetermined relation to the workpiece. Such saw tables conventionally have a portion of the table angularly adjustable and provided with one or more guide rails for supporting the saw.

Among the objects of the invention are to provide a saw table which has an independent track supported in predetermined relation to the table from a point beneath the table which saw table is made of a minimum number of parts at low cost and requires minimum maintenance.

SUMMARY OF THE INVENTION

In accordance with the invention, the saw table includes a table for supporting a workpiece, a track and means for rotatably mounting said track from beneath said table such that a portable saw movable along the track is supported in spaced relation to the table for cutting a workpiece on the table.

DESCRIPTION OF THE DRAWINGS

FIG. 1 is a plan view of the portable saw table embodying the invention.

FIG. 2 is a view taken along the line 2—2 in FIG. 1.

FIG. 3 is a sectional view taken along the line 3—3 in FIG. 1.

FIG. 4 is a view taken along the line 4—4 in FIG. 1.

FIG. 5 is a fragmentary sectional view taken along the line 5—5 in FIG. 1.

DESCRIPTION

Referring to FIGS. 1 and 3, the portable saw table embodying the invention comprises a flat work supporting table 10 of organic plastic material such as high density polyethylene mounted on longitudinally extending rails 11 having an inverted U-shaped cross section and comprising aluminum extrusions. Table 10 is mounted by means of screws 12 extending into the rails 11 and is reversible to accommodate wear. In other words, the table has auxiliary openings 12a so that when it is turned over, the openings 12a will be in proper registration so that the screws 12 can be threaded into the rails 11.

Figure 6:
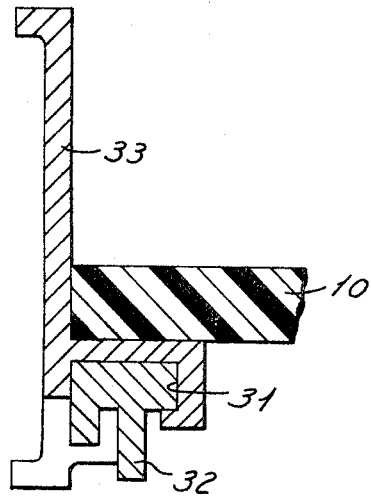
FIG. 6 is a fragmentary sectional view on an enlarged scale taken along the line 6—6 in FIG. 1.
Figure 7:
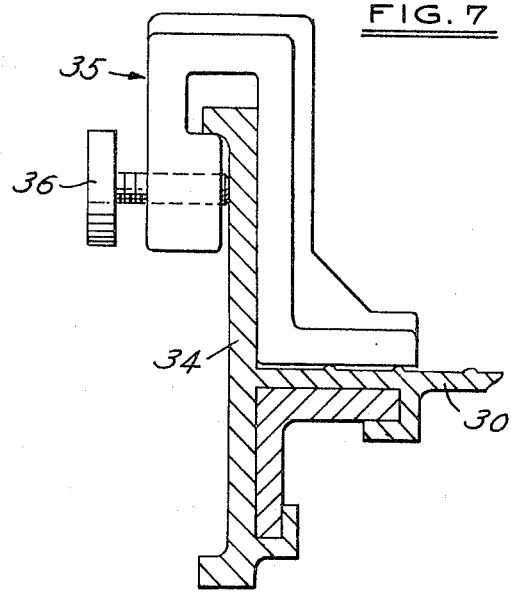
FIG. 7 is a fragmentary sectional view taken along the line 7—7 in FIG. 1.
Figure 8:
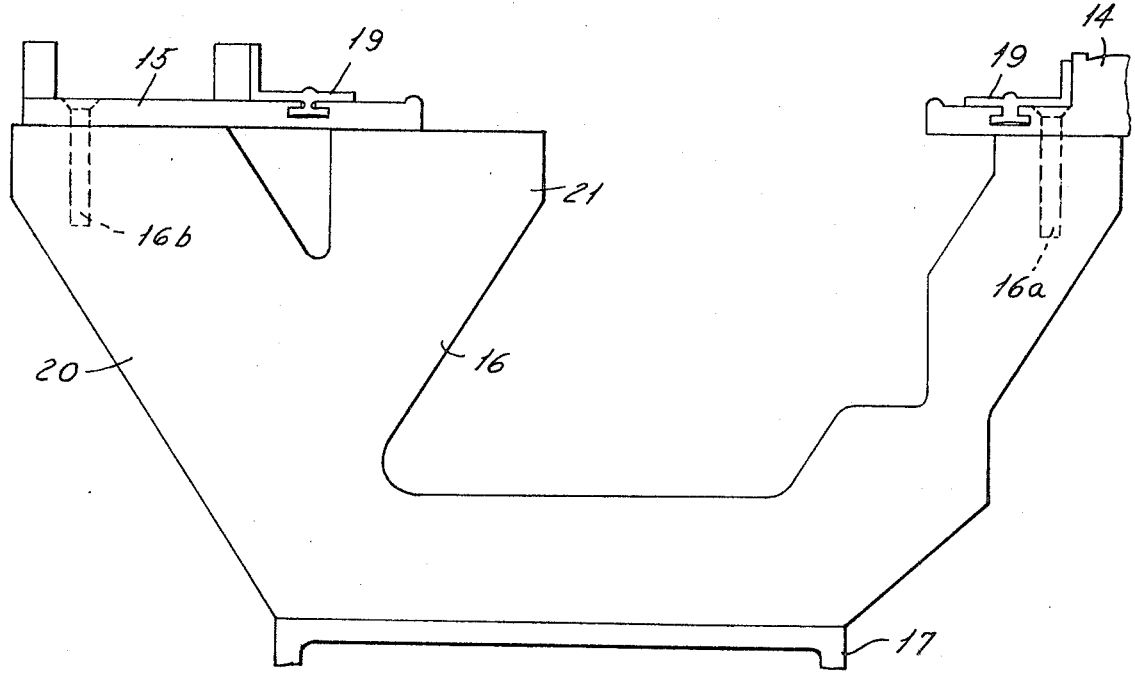
FIG. 8 is a fragmentary sectional view on an enlarged scale taken along the line 8—8 in FIG. 1.

Referring to FIG. 8, a pair of guide rails 14, 15 are supported by screws 16a, 16b on end members 16 to define a guide or track for the portable saws. Each of the end members 16 is supported on a beam 17 that is pivoted to the underside of the table by a bolt 18. The rails 14, 15 are provided with vinyl strips 19 having portions extending into grooves in the rails, providing low friction surfaces for saw S in accordance with well known construction. Bolt 16b extends through an elongated opening 16c in projection 21 so that rail 14 can be selectively positioned on stanchion 16 to accommodate saws of different widths.

A protractor 25 is fixed to the table 10 by screws 25a extending into brackets 25b fixed to the protractor and is formed with indicia 26 in the form of angular markings. The center of protractor 25 is at the axis of bolt 18 which rotatably mounts the track on the table. Rotation of the beam 17 and in turn the track about the bolt 18 positions the track at varying angular positions with respect to the table. The track can be locked in any angular position by rotation of the hand screw 27 threaded into a bracket 28 fixed to the beam 17 and rotatable into engagement with the protractor 25 (FIG. 3).

Extension tables 30 are provided in longitudinally spaced relation to the main table and each of these tables comprises an extrusion with portions 29 telescoped over the rails 11 (FIG. 2).

Opposed extension tables are provided with generally T-shaped extruded openings 31 along the rear edge thereof and a complementary bar 32 extends between the openings 31 beneath the rear edge of table 10. Backstop members 33 having a complementary cross section are slidingly telescoped on bar 32 to provide a backstop for workpieces and a support for saw S. In use the beam 17 rests on the upper edge of some of the backstop members 33, as shown in FIG. 1. The telescoped members 33 are slidable along the rear of table 10 so that as the saw track moves through any angle, the backstops 33 may move accordingly out of interfering position.

Further in accordance with the invention, an integral backstop 34 is provided along upright portions of the extension tables 30 to serve as a backstop for the work on them. One or more endstops 35 are telescoped over backstop 34 and are slidable therealong to provide an endstop for workpiece. A hand screw 36 locks the endstop 35 in predetermined position as may be desired.

A handle 37 is bolted to the table 10 for carrying the saw table. Extension bars 38 are provided in the openings 31 and are provided with measuring indicia so they may be pulled out for measuring.

In use, the worker adjusts the track to the desired angular relation with respect to the work table, places the workpiece on the table, places the saw on the track, and then manipulates the saw as required to cut the workpiece. The track functions to hold the saw blade at the required position to cut the workpiece.

We claim:

1. In a saw table, the combination comprising
   a table for supporting a workpiece,
   means defining a track,
   said track having guide means for guiding a portable saw,
   means for pivotally supporting said track about an axis extending through said table in spaced relation to said table such that the saw blade is supported in spaced relation to the table as the saw is moved along the track,
   means for locking said track in angularly determined position with respect to said table,
   said table including a plurality of backstops along one edge thereof, said backstops being slidably engaged with said table such that they can be moved to support the track and accommodate the angular movement of the track with respect to said table.

2. In a saw table, the combination comprising a table for supporting a workpiece,
laterally spaced longitudinally extending extruded rails fixed to the underside of said table,
means defining a track,
said track having guide means for guiding a portable saw,
means for pivotally supporting said track about an axis extending through said table in spaced relation to said table such that the saw blade is supported in spaced relation to the table as the saw is moved along the track,
means for locking said track in angularly determined position with respect to said table,
an extruded extension to said table, said table and said extension have interengaging telescoping portions,
said extension including a longitudinally extending opening, a bar telescoped into said opening and a plurality of backstops telescoped on said bar along one edge of said table, said backstops being slidably engaged with said bar such that they can be moved to accommodate the angular movement of the track with respect to said table.

3. In a saw table, the combination comprising
a table for supporting a workpiece,
laterally spaced longitudinally extending extruded rails fixed to the underside of said table,
means defining a track,
said track having guide means for guiding a portable saw,
means for pivotally supporting said track on one of said rails about an axis extending through said table in spaced relation to said table such that the saw blade is supported in spaced relation to the table as the saw is moved along the track,
and means for locking said track in angularly determined position with respect to said table,
said means for pivotally supporting said track comprising a beam pivoted to the underside of the table and having members on the ends thereof, said track comprising spaced rails, said rails being fixed on said end members,
and a backstop member slidably engaging said table and supporting a portion of said beam in any angular position.

4. In a saw table, the combination comprising
a table for supporting a workpiece,
means defining a track,
said track having guide means for guiding a portable saw,
means for pivotally supporting said track about an axis extending through said table in spaced relation to said table such that the saw blade is supported in spaced relation to the table as the saw is moved along the track,
means for locking said track in angularly determined position with respect to said table,
said table including at least one pair of backstops along one edge thereof, one adjacent each side of the track, said backstops being slidably engaged with said table such that they can be moved to accommodate the angular movement of the track with respect to said table.

5. In a saw table, the combination comprising
a table for supporting a workpiece,
means defining a track,
said track having guide means for guiding a portable saw,
means for pivotally supporting said track about an axis extending through said table in spaced relation to said table such that the saw blade is supported in spaced relation to the table as the saw is moved along the track,
means for locking said track in angularly determined position with respect to said table,
said table including a plurality of backstops along one edge thereof, said backstops being slidably engaged with said table and engageable by said track such that said backstops are movable to accommodate the angular movement of the track with respect to the table.

6. In a saw table, the combination comprising
a table for supporting a workpiece,
means defining a track,
said track having guide means for guiding a portable saw,
means for pivotally supporting said track about an axis extending through said table in spaced relation to said table such that the saw blade is supported in spaced relation to the table as the saw is moved along the track,
means for locking said track in angularly determined position with respect to said table,
at least the portion of the table underlying the track being made of organic plastic material,
said portion having opposed work surfaces,
and interengaging means between said portion and the remainder of said table such that said portion can be reversed.

* * * * *